Patented Aug. 16, 1949

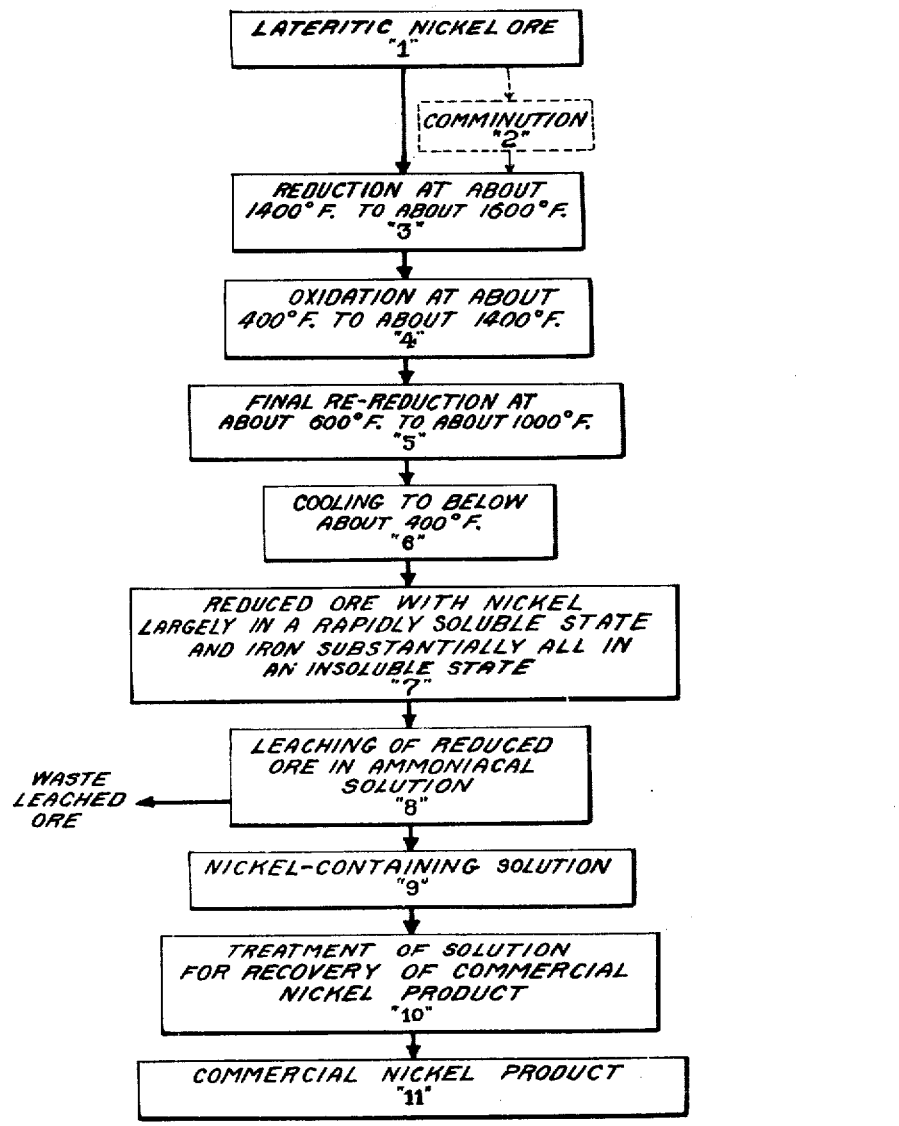

2,478,942

UNITED STATES PATENT OFFICE 2,478,942

PROCESS FOR THE TREATMENT OF NICKEL-CONTAINING ORES

Paul Etienne Queneau and John Harold Borland, Copper Cliff, and Louis Secondo Renzoni, Port Colborne, Ontario, Canada, assignors to The International Nickel Company, Inc., New York, N. Y., a corporation of Delaware Application October 8, 1947, Serial No. 778,558
In Venezuela January 24, 1947

10 Claims. (Cl. 75—82)

The present invention relates to a process for the treatment of lateritic ores containing small amounts of nickel, and, more particularly, to an improvement in the ammonia leaching process for recovering small amounts of nickel from limonitic and silicate ores, which utilizes a novel combination of operations for controlling the solubility and insolubility of various elements in the ores and for preferentially leaching therefrom soluble values, including nickel, while at the same time, retaining the insoluble elements, including iron, as residue with the gangue.

The ammonia process referred to above is the one developed by M. H. Caron for treatment of lateritic nickel ores. He recommended that the ore be reduced in the range 1300° to 1800° F. using a gas containing, cumulatively or alternatively, a ratio of $CO : CO_2$ and $H_2 : H_2O$ equal to or less than 50:50, that the ore then be cooled from the reduction temperature in a controlled atmosphere containing water vapour and/or carbon dioxide, and that it then be leached in an ammoniacal solution of ammonium carbonate from which nickel-rich precipitate and reagent gases are recovered by heating. Another early investigator, T. Tatebe, recommended that a carefully controlled, gradual rate of temperature increase be observed in the reduction process. The majority of investigators placed an upper limit on the strength of the reducing gases employed, with a view to minimizing the reduction of iron oxides.

The improved process involves a novel combination of pyrometallurgical and hydrometallurgical operations in which the nickel values are economically recovered from the bulk of undesirable gangue material and are obtained in a form of a product which may be further processed to convert the nickel to the oxide or metallic state by known conventional methods.

The particular ores contemplated for treatment by the novel process comprise mainly hydrated magnesium silicates and iron oxides in which nickel is present in minor amounts along with small amounts of such elements as cobalt, chromium, and copper, and which exists as weathered (lateritic) surface or sub-surface deposits, such as the ores found in Venezuela, New Caledonia, the Celebes and Cuba. For instance, in a particular ore which is economically treatable by this process, the nickel is present in varying proportions within the magnesium silicate and possibly within the iron oxide, in small amounts usually considerably less than 5%. This raw ore, before processing, contains free moisture and also combined water (water of hydration).

X-ray, microscopic, thermal and chemical analyses carried out on lateritic nickel ores from various localities reveal that they are largely composed of varying amounts of hydrous magnesium silicate such as antigorite; iron oxide in the form of limonite, goethite, and hematite; and silica. Most of the nickel apparently occurs in the antigorite crystal structure as a replacement of the magnesuim.

Upon heating such ores in a non-reducing atmosphere changes in the antigorite crystal structure begin at a temperature well below 1000° F. At about 1200° F., the antigorite has decomposed and by 1400° F. reorganization of the crystal structure has commenced. At 1600° F. this recrystallization is well advanced, and at 1800° F. it is substantially complete, the predominant mineral present apparently being olivine. These investigations indicate that an increasing amount of the nickel becomes tightly held in the new mineral structure as temperature rises through the range 1200° F. to 1800° F. Some variations in ore behavior were observed, as would be expected in view of differences in ore mineralogy.

Consideration of the above leads to the conclusion that the type of thermal treatment to which the ore is subjected for purposes of reduction, with respect to gas analysis and rate of heating, is not of a critical nature below 1200° F. The controlling factor below this temperature is therefore primarily economy in equipment design and fuel consumption. Above 1200° F. it is important that a strongly reducing atmosphere be employed and that the ore be treated for an adequate length of time. Necessary treatment time, in the range 1200° to 1600° F., has been found to decrease with increase in temperature and strength of reducing gas. Under these conditions, most of the nickel and a substantial quantity of the iron present in the ore are reduced to the elemental state. If the treatment temperature is increased appreciably above 1600° F., we have found that a detrimental effect on nickel recovery results, which may be explained in terms of the above-noted transformation occuring in this temperature range.

In attempting to treat ores of this nature by conventional ammonia leaching methods, it has been found that such processes are not commercially feasible in that they are too costly.

Broadly stated, the novel combination of operations comprises subjecting the ore in a finely divided state to a reduction treatment under controlled conditions of temperature, time, atmosphere and pressure whereby nickel values are obtained in a state of maximum solubility for subsequent leaching in ammoniacal solutions, and the undesirable gangue minerals are maintained largely insoluble in the same leaching solutions. Should the ore to be treated be of too coarse a particle size, it may be subjected to a preliminary comminution before subjecting the ore to the reduction treatment. The main interfering constituent in the gangue is iron oxide. The prior art teaches that some iron oxide is unavoidably reduced to a state soluble in the leaching solution, but infers that such reduction should be kept at a minimum. In contrast, we have found that in order to obtain maximum nickel recovery it is important that substantial quantities of iron oxide be so reduced. Since operating conditions and ore characteristics are such that it is necessary, for economic operation, to reduce contamination of the nickel bearing leaching solution by iron to a minimum and, at the same time, to maintain maximum solubility of the nickel values, the reduced ore is subjected to an oxidation-reduction treatment prior to extraction of the nickel by the leaching operations. After reducing, oxidizing, re-reducing and cooling the ore, the ore is then immersed in a leaching solution in which the nickel values will dissolve but in which the bulk of the undesirable mineral matter will remain insoluble. The insoluble solids are then separated from the nickel-bearing solution, and the nickel values recovered from said solution as a product which can be converted, if required, to an oxide or to metal by known methods.

For the purpose of giving those skilled in the art a better understanding of the improved process, an example of the novel combination of operations is illustrated in the accompanying flow sheet. The aforesaid example comprised first treating finely divided, lateritic nickel-containing ores containing less than about 5% nickel by reduction operation "3," at a preferred temperature between about 1400° and about 1600° F. for from about 2 to about 4 hours in a controlled atmosphere comprising about 20% to 40% by volume of hydrogen plus carbon monoxide, about 10% to 20% by volume of water vapor plus carbon dioxide, and the balance nitrogen. Sulfur may be present to advantage during reduction in amounts between about 0.1% and 1.0% of the ore. In carrying the reduction operation into practice, it was found that the duration of the holding period in the reducing temperature range is a most important factor in effecting chemical reactions in order to obtain high nickel recoveries. We have found considerable difference in the response of lateritic ores obtained from different parts of the world to the ammonia leaching process depending on their constitution. Accordingly, exact conditions of treatment for optimum metallurgy within the above ranges require test determination. Typical ores reduced under a single set of conditions in accordance with the foregoing method, gave the results set forth in the following schedule:

| Origin of Ore | Analyses of Raw Ore | | Solubility of Reduced Ore by Ammonia Leach | |
|---|---|---|---|---|
| | Per Cent Ni | Per Cent Fe | Per Cent of Ni Content | Per Cent of Iron Content |
| Celebes | 3.6 | 12 | 88 | 17 |
| Cuba | 1.9 | 52 | 91 | 19 |
| Do | 1.3 | 49 | 88 | 18 |
| New Caledonia | 4.8 | 20 | 87 | 19 |
| Do | 2.4 | 23 | 86 | 18 |
| Venezuela | 1.8 | 15 | 86 | 20 |

It is well known to those skilled in the art that the values actually obtained for the amount of iron that has been made soluble in ammoniacal solutions by the foregoing reduction treatment may vary according to the method of analysis employed. Iron solubility is defined herein as iron soluble in ammoniacal leach solution containing a sufficient quantity of ammonium citrate to prevent precipitation of said iron. However, it is to be understood that the improvement effected by the present novel process over the prior processes is of course independent of analytical methods. As indicated in the above schedule, this treatment rendered more than 15% by weight of the iron and more than 85% by weight of the nickel present in the ores soluble in the ammoniacal leaching solution. The ores were then cooled to about 1000° F. and treated, in accordance with oxidation operation "4," for about 30 minutes in a controlled atmosphere comprising about 33% by volume of carbon dioxide and water vapor and the balance mainly nitrogen. This treatment oxidized a substantial amount of the nickel and all but about 1% of the iron present in these ores to a state insoluble in the usual ammoniacal leaching solution. The ores were then re-reduced in accordance with operation "5" for about two hours at about 800° F. in a hydrogen-rich atmosphere, containing about 30% by volume of hydrogen plus carbon monoxide, the balance being mainly water vapor and carbon dioxide. This final low temperature reduction was effective in obtaining more of the nickel in a highly soluble state, in relation to the proportion of iron reduced to a soluble state, than is obtainable by any other process heretofore known. Considerable latitude exists with respect to the selection of gaseous atmospheres and temperatures employed in the above oxidation and reduction reaction. It will be understood by those skilled in the art that thermodynamic data can be employed to determine changes in free energy in these reactions. From the free energy changes at a particular temperature, equilibrium constants for the reactions can be calculated, thus relating the equilibrium concentrations of gaseous reactants to gaseous products. Reference to equilibrium constants for given temperatures will assist in choosing suitable gases for the desired selective oxidation or reduction. Conclusions drawn from such calculations must of course be used in conjunction with actual small-scale tests, due to possible interference by unforeseen factors. For instance, although, theoretically, the desired reaction will proceed, it may not do so at a useful rate.

Low iron solubility and high nickel solubility is most important since such characteristics permit the attainment of pregnant solutions of much higher nickel content than otherwise possible. For instance, the prior art records pregnant solutions containing up to 2.0% by weight of nickel. By use of our improved procedures we have obtained pregnant solutions containing over 4.0% nickel when leaching ore containing less than 2.0% nickel. After cooling the reduced ore, more than about 85% of the nickel and less than about 5% of the iron present in the thus-treated ore is soluble in the ammoniacal leaching solution. In cooling operation "6," the ore is cooled to below about 400° F. in the same atmosphere as was used in the final low temperature re-reduction operation "5." The cooled ore is then treated by an ammoniacal leaching operation "8" and the waste leached ore is then separated from the aqueous nickel-containing ammoniacal solution. The nickel-containing ammoniacal solution is then treated by operation "10" to obtain a commercial nickel product "11."

Iron is an important factor in that it is the main interfering element in the treatment of lateritic nickel-containing ores by the ammonia-leaching process. Iron has chemical characteristics sufficiently similar to those of nickel so that a sharp separation is difficult in a conventional pyrometallurgical reduction treatment. Thus, during the high temperature reduction phase of the process, optimum operating conditions require a strongly reducing atmosphere which will cause objectionable amounts of undesired iron to be reduced together with the desired nickel. The ratio of reduced iron to reduced nickel, for a given reduction temperature and atmosphere, depends upon the nature of the ore being treated. Thus, for instance, a limonitic type of nickel ore, containing 50% iron, is a more serious offender than a silicate type of ore containing only 15% iron. A detrimental effect resulting from the reduction operation is that some of the insoluble iron in the ore is converted to soluble iron and such soluble iron is dissolved by the ammoniacal leaching solution as a ferrous salt. Upon oxidation during subsequent leaching operations, voluminous ferric hydroxide precipitates are formed which are deleterious to efficient performance of the leaching circuit in that efficient thickening of the pulp solids and separation of adsorbed and occluded nickel-bearing solution therefrom is impaired. Prior methods for overcoming this problem, such as the use of a relatively weak reducing atmosphere in the reduction operation or, alternatively or consecutively, a preferential oxidation of the reduced iron after reducing and prior to leaching, tend to minimize the amount of soluble iron in the reduced ore. On the other hand, these same procedures also tend to decrease the amount of soluble nickel in the reduced ore, the first method by preventing reduction of the maximum amount of nickel values to the soluble state, and the second method by oxidizing to the insoluble or slowly soluble state some of the nickel which has already been reduced.

The major feature of the new process is to permit more effective operation of the leaching cycle in the ammonia-leaching process by inhibiting the solubility of iron in the reduced ore, and coincidentally, by improving the solubility of nickel in the reduced ore. A major advantage of the contemplated procedure is that it is carried out independently of the primary reduction of the ore and yet is accomplished prior to the leaching operation. In this manner the primary reducing treatment in the kiln can be carried out with sole regard to obtaining the maximum reduction of the nickel. Thus, very strongly reducing gases and high temperatures can be employed in the reduction operation "3" proper, since possible later ill effects, due to the concomitant reduction of iron minerals, are largely eliminated by the subsequent oxidation operation. For instance, certain investigators have specified that the maximum $CO:CO_2$ and $H_2:H_2O$ volumetric ratio in the reducing gas employed should be 70:30, and other investigators have specified much lower ratios than this. In contrast, we have found that high nickel recovery and high ore throughput capacity is favored by reducing gases having a ratio of reducing components, e. g., hydrogen and/or carbon monoxide and/or paraffins which are gaseous at normal temperature and pressure, to oxidizing components, e. g., water vapor and/or carbon dioxide, even higher than the aforesaid maximum ratio. In general, improved results are obtained when the reducing atmosphere contains a ratio of combustible gases to water vapor plus carbon dioxide of more than about 50:50 by volume. The aforementioned ratio does not include inert components of the gas but is based on the total active components of the gas, i. e., the oxidizing and the reducing components. Such a suitable highly reducing gas includes an atmosphere in which over 50% of the total active components is gaseous hydrogen. In order to achieve such a high ratio and yet maintain a satisfactory furnace temperature, we have found the use of oxygen or oxygenated air highly satisfactory. Furthermore, decrease in the proportion of nitrogen present in the furnace atmosphere results in lower dust and heat losses and less dilution of the reducing gas. Such a reducing atmosphere, produced by the use of oxygen or oxygenated air as a supporter of combustion and to maintain a satisfactory furnace temperature, will contain substantially less than about one-half nitrogen by volume, for instance, about one-third nitrogen by volume. As a matter of fact, even commercially pure hydrogen can be used to advantage for reduction purposes. In the case of high hydrogen-containing atmospheres, heating of the ore to the reduction temperature may be accomplished out of direct contact with the heating gases and such temperature is substantially lower than that required by reducing gases previously recommended. For instance, substantially higher nickel recoveries than those indicated can be obtained from the ores noted in the above schedule, by use of hydrogen for reduction purposes at a temperature of about 1200° F. Use of such a strongly reducing gas in this manner has not been considered feasible heretofore, partly due to the resulting reduction of iron and its precipitation in prohibitive amounts as ferric hydroxide in the leaching circuit. Our reduction, oxidation and re-reduction procedure provides a method for iron control which permits the use of the most strongly reducing gases in the primary reduction step. Oxidation of the iron, at temperatures below the high primary reduction temperature can be carried out with much less regard for harmful effects on nickel solubility than are required in the more critical reduction-oxidation procedures recommended by the prior art. Unless extraordinary care is exercised, simple reduction and preferential oxidation causes a serious decrease in nickel recovery. Lastly, the second phase of solubility control, to wit, final re-reduction of the nickel in operation "5," is carried out at a relatively low temperature out of contact with combustion gases, which permits close control of operating variables, including gas composition.

The equipment for accomplishing this novel feature of solubility control comprises two sections, in the first of which the reduced ore is oxidized under controlled conditions of temperature, time, pressure and atmosphere, followed in the second section by re-reduction of nickel under similarly controlled conditions but usually at lower temperatures. The important features of the solubility-control operations reside in the carefully controlled treatment times, atmospheres and temperatures employed in both the oxidation and re-reduction treatments of the ore rather than in the design of the apparatus used. Thus, for instance, in carrying out the novel sequence of operations contemplated by the present invention, a preferred method is to carry out the initial, high-temperature reduction of the ore in the unitary kiln structure, i. e., integral assembly of preheating zone, reducing zone, cooling zone and combustion chamber, described in the co-pending Sproule, Young and Snitch application, U. S. Serial No. 2,838, and then oxidizing, re-reducing and cooling the ore in a separate unit. Another method for successfully accomplishing the desired, novel results of the present process would be to use two individual kilns or a two-compartment rotary kiln or a hearth-type furnace. It has been found that there is considerable latitude in the choice of gases which may be used for the oxidation step since it is not essential that high selectivity of oxidation be secured at this point. Thus, gases varying in oxidizing power from mild to fairly strong may be employed throughout a wide temperature range, i. e., from about 400° F. to about 1400° F. A gas which has given good results includes primary reduction kiln exhaust gas. The presence of appreciable amounts of oxygen in this gas has been found permissible. For reasons of economy in equipment and operational costs, the preferred temperature for oxidation lies in the range below the primary reduction temperature and above the secondary re-reduction temperature that follows. In the oxidation treatment, iron is oxidized to forms not readily reduced in the subsequent, final, low-temperature, re-reduction treatment. The final re-reduction operation is carried out at a low temperature so as to obtain maximum reduction of nickel in a highly active form which is rapidly soluble in the ammoniacal leaching solution. This objective can be achieved while avoiding conversion of important quantities of iron into forms soluble in the ammoniacal leaching solution. The recommended re-reduction temperature is above about 600° F. and below about 1000° F. Gas rich in hydrogen has been found to give a reduction atmosphere particularly satisfactory from the viewpoint of producing highly active nickel which dissolves quickly and readily in ammoniacal leaching solutions.

A benefit which may accrue under certain conditions from the utilization of the novel reduction plus oxidation plus re-reduction process is the means it affords for sulfur control in the final product. The novel process also affords an opportunity for decreasing the undesirable activity of residual hydrocarbon contaminants in the reduced ore.

When it is stated in this specification that the nickel is in a highly "active" form or is highly "active" or that there is high nickel "activity," it is meant that the nickel is in a rapidly soluble form with respect to its rate of dissolution in ammoniacal leaching solutions. In describing various embodiments of this novel process, it is to be understood that whenever nickel is mentioned in this specification, cobalt is also included, since cobalt values present will usually be processed and extracted with the nickel values.

Although the present invention has been described in conjunction with certain preferred embodiments, it is to be understood that modifications and variations may be resorted to without departing from the spirit and scope of the invention, as those skilled in the art will readily understand. Such variations and modifications, for instance, the treatment of roasted iron sulfide ore containing nickel with or without copper, are to be considered within the purview of the application and the scope of the appended claims.

We claim:

1. A process for recovering nickel from ore containing the same which comprises treating said ore in the presence of controlled atmospheres and at elevated temperatures to reduce most of the nickel and some iron, then to oxidize substantially all of the reduced iron and some nickel and then to re-reduce nickel without substantial reduction of iron, immersing said treated ore in a leaching solution to produce a nickel-containing solution, and recovering nickel from said nickel-containing solution as an industrial product.

2. A process for recovering nickel from ore containing the same which comprises reducing finely divided ore to obtain nickel in a state whereby said nickel is largely soluble in a leaching solution and to obtain iron present in said ore in a state partially insoluble in said leaching solution by means of heating said ore to elevated temperatures in a controlled reducing atmosphere, treating said reduced ore in an oxidizing atmosphere at a lower temperature to obtain iron in a state substantially insoluble in said leaching solution, then further treating said reduced and oxidized ore in a reducing atmosphere to obtain nickel in a state readily soluble in said leaching solution without substantial reduction of iron, leaching the thus-treated ore in said leaching solution whereby nickel in the ore is obtained in solution and other elements in the ore remain largely as solids, separating the nickel-containing solution from said solids, and recovering nickel from said nickel-containing solution as an industrial product.

3. A process for recovering nickel from nickel-containing, limonitic and silicate ores containing small amounts of nickel and the balance mainly hydrated oxides of iron and hydrated silicates of magnesium which comprises comminuting said ore to a fine particle size, reducing nickel in the ore to a state largely soluble in an ammoniacal leaching solution and iron present in said ore in a state partially soluble in said leaching solution, by means of treating said ore at temperatures of about 1400° F. to about 1600° F. in a controlled reducing atmosphere, treating said ore in a controlled oxidizing atmosphere at a temperature below about 1400° F. to obtain iron in a state substantially insoluble in said leaching solution, then further treating said ore in a controlled reducing atmosphere at a temperature below about 1000° F. and above about 600° F. to obtain nickel in a state readily soluble in said leaching solution without substantial reduction of iron into forms soluble in said leaching solution, cooling said ore in a controlled atmosphere, immersing said ore in said leaching solution to form a pulp, leaching said ore whereby nickel present in the ore is obtained in solution and other elements present in the ore remain largely as undissolved waste matter, separating nickel-containing solution from said undissolved waste matter, and recovering nickel from said nickel-containing solution as an industrial product.

4. In the art of recovering nickel from ore containing the same, the improvement which comprises treating said ore at elevated temperatures in a controlled reducing atmosphere to obtain most of the nickel and some of the iron in a state soluble in a leaching solution, then treating said ore at lower temperatures in a controlled oxidizing atmosphere to oxidize substantially all of the reduced iron and some of the reduced nickel to a state substantially insoluble in said leaching solution, and then treating said ore to re-reduce oxidized nickel in a controlled reducing atmosphere at still lower temperatures to re-reduce oxidized nickel with concomitant reduction of iron to a state substantially soluble in said leaching solution.

5. A process for recovering nickel from lateritic nickel-containing ore involving ammonia leaching to produce nickel-containing pregnant leaching solution and nickel-depleted waste pulp, which comprises treating the ore to reduce most of the nickel and some iron contained in said ore, oxidizing substantially all of the reduced iron and some nickel, and re-reducing the nickel without substantial reduction of iron to obtain a minimum precipitation of ferric hydroxide in the leaching circuit whereby the nickel content of the pregnant leaching solution is increased and the nickel content of the waste pulp is decreased.

6. A process for recovering nickel from lateritic nickel-containing ore involving dissolving and concentrating the nickel in ammoniacal leaching solution, which comprises treating ore so as to reduce most of the nickel and some iron, oxidizing substantially all of the reduced iron and some nickel, and re-reducing the nickel without substantial reduction of iron in a gas rich in hydrogen whereby the rate of nickel solution and the concentration of nickel dissolved in the ammonia leaching solution are markedly increased.

7. In the ammonia leaching process for treating lateritic nickel-containing ore for recovering nickel therefrom, the improvement which comprises treating the ore to reduce most of the nickel and some iron by using at least one gas from the group consisting of oxygen and oxygenated air for fuel combustion, oxidizing substantially all of the reduced iron and some nickel, and re-reducing the nickel without substantial reduction of iron, thereby substantially increasing the proportion of nickel recoverable by ammonia leaching.

8. A process for recovering nickel from ore containing the same which comprises treating said ore at elevated temperatures in a controlled atmosphere containing a ratio of combustion gases to water vapor plus carbon dioxide of more than about 50:50 by volume to reduce most of the nickel and some iron, then to oxidize substantially all of the reduced iron and some nickel and then to re-reduce nickel without sunbstantial reduction of iron, immersing said treated ore in a leaching solution to produce a nickel-containing solution, and recovering nickel from said nickel-containing solution as an industrial product.

9. A process for recovering nickel from ore containing the same which comprises treating said ore at elevated temperatures out of contact with heating gases and using for reduction purposes an atmosphere comprising essentially gases from the group consisting of hydrogen, carbon monoxide and paraffins gaseous at normal temperature and pressure to reduce most of the nickel and some of the iron, then to oxidize substantially all of the reduced iron and some nickel and then to re-reduce nickel without substantial reduction of iron, immersing said treated ore in a leaching solution to produce a nickel-containing solution, and recovering nickel from said nickel-containing solution as an industrial product.

10. A process for recovering nickel from ore containing the same which comprises treating said ore at elevated temperatures in contact with heating gases and using for reduction purposes a reducing atmosphere containing substantially less than about one-half nitrogen by volume to reduce most of the nickel and some iron, then to oxidize substantially all of the reduced iron and some nickel and then to re-reduce nickel without substantial reduction of iron, immersing said treated ore in a leaching solution to produce a nickel containing solution, and recovering nickel from said nickel-containing solution as an industrial product.

PAUL ETIENNE QUENEAU.
JOHN HAROLD BORLAND.
LOUIS SECONDO RENZONI.

REFERENCES CITED

The following references are of record in the file of this patent:

UNITED STATES PATENTS

| Number | Name | Date |
|---|---|---|
| 2,400,098 | Brogdon | May 14, 1946 |
| 2,400,115 | Hills et al. | May 14, 1946 |